(12) United States Patent
Cheng (10) Patent No.: US 8,790,475 B2
(45) Date of Patent: Jul. 29, 2014

(54) METHOD FOR FORMING LOOP MEMBER OF HOOK-AND-LOOP FASTENER, APPARATUS FOR PERFORMING THE METHOD, AND ARTICLE MANUFACTURED BY THE METHOD

(75) Inventor: Allen Cheng, Chang Hwa Hsien (TW)

(73) Assignee: Taiwan Paiho Limited, Chang Hwa Hsien (TW)

( * ) Notice: Subject to any disclaimer, the term of this patent is extended or adjusted under 35 U.S.C. 154(b) by 14 days.

(21) Appl. No.: 12/929,829

(22) Filed: Feb. 18, 2011

(65) Prior Publication Data

US 2012/0096688 A1    Apr. 26, 2012

(30) Foreign Application Priority Data

Oct. 26, 2010 (TW) ................. 99136503 A (51) Int. Cl.
| | |
|---|---|
| *B23P 11/00* | (2006.01) |
| *B32B 37/00* | (2006.01) |
| *B29C 65/02* | (2006.01) |
| *B29C 65/00* | (2006.01) |

(52) U.S. Cl.
CPC ............ *B32B 37/0053* (2013.01); *B29C 65/02* (2013.01); *B29C 66/43* (2013.01)
USPC ............................. 156/178; 156/176; 156/177

(58) Field of Classification Search
CPC ...... B29C 65/02; B29C 66/43; B32B 37/0053
USPC ............ 156/73.1, 73.2, 176, 177, 178, 308.2; 24/442, 447, 448; 428/100
See application file for complete search history.

(56) References Cited

U.S. PATENT DOCUMENTS

| | | | | |
|---|---|---|---|---|
| 5,830,298 | A | * 11/1998 | Jackson ........................ | 156/66 |
| 5,974,635 | A | * 11/1999 | Murasaki ..................... | 24/446 |
| 6,096,667 | A | * 8/2000 | Rhode .......................... | 24/446 |
| 6,604,264 | B1 | * 8/2003 | Naohara et al. ............. | 24/444 |
| 7,395,583 | B2 | * 7/2008 | Clune et al. ................. | 24/451 |
| 2002/0137418 | A1 | 9/2002 | Seth | |
| 2004/0022993 | A1 | 2/2004 | Wildeman | |

FOREIGN PATENT DOCUMENTS

| | | |
|---|---|---|
| EP | 0 341 993 A1 | 11/1989 |
| EP | 0 661 007 A2 | 7/1995 |
| JP | 9-19309 A | 1/1997 |

OTHER PUBLICATIONS

Search Report dated Nov. 4, 2013 issued in corresponding European application No. 11 16 6544.4.

* cited by examiner

*Primary Examiner* — Katarzyna Wyrozebski Lee
*Assistant Examiner* — John Blades
(74) *Attorney, Agent, or Firm* — Bacon & Thomas, PLLC (57) ABSTRACT

The embodiments of the present invention provide a novel method for forming a loop member of a hook-and-loop fastener assembly. According to one embodiment, the method comprises continuously providing a plurality of yarns in a predetermined pattern; plastically deforming the yarns into a desired loop shape; continuously providing a web of substrate; and directly securing the yarns that have been plastically deformed into a desired loop shape to the substrate with a bonding process, thereby a loop member of a hook-and-loop fastener assembly having both a high fastening strength and a high engagement stability may be manufactured speedily, massively and at a low cost. The embodiments of the present invention also provide an apparatus for performing the method.

4 Claims, 8 Drawing Sheets

METHOD FOR FORMING LOOP MEMBER OF HOOK-AND-LOOP FASTENER, APPARATUS FOR PERFORMING THE METHOD, AND ARTICLE MANUFACTURED BY THE METHOD

FIELD OF THE INVENTION

The present invention relates generally to mechanical fasteners, and more specifically to a method for forming loop member of hook-and-loop fastener, apparatus for performing the method, and article manufactured by the method.

BACKGROUND OF THE INVENTION

A hook-and-loop type fastener assembly is a well know mechanical fastener and wildly used in a variety of application that need to releasably hold two mating parts together, such as garment, hats/caps, shoes, personal care product (such as diapers) etc., because of its easy engaging/disengaging characteristic. The hook-and-loop type fastener assembly mainly consists of a hook strap on which an array of hooks are formed and a loop member on which a plurality of fabric loops are formed to be engaged with the hooks of the hook strap.

Recently, an application of the hook-and-loop fastener assembly to the disposable diaper is gaining more and more interest in the field. Improving the functionality and comfortableness of a diaper is a continuous and sustained goal in the diaper industry. Owing to the drawbacks of inconvenience in use and not suitable for repeatedly use, traditional backing adhesive type fastening means used to hold the diaper on a wearer is gradually replaced by a mushroom-headed hook type of hook-and-loop fastener assembly. The loop member used in the mushroom-headed hook type of hook-and-loop fastener assembly usually is a knitwear type loop member.

Generally, the knitwear type loop member used to mate with the mushroom-headed hook strap of the mushroom-headed hook type of hook-and-loop fastener assembly is a Weft knitting fabrics. However, because a knitting fabrics has a relative loose texture and a greater flexibility, the hook strap and the loop member may still be displaced laterally or even in a normal direction relative to each other, and this would cause poor fastening result and insufficient fastening strength problems. Traditional means that are taken to address these problems is to increase the woof density and shortening the length of the loops. However, the improvements resulting from these traditional means are not satisfactory. Additionally, in a post-process of a knitted fabric a PU coating and a PVC backing adhesive are applied. However, the PU coating has drawbacks such as not easy to be applied evenly, unable to sustain high water pressure, and dissolvable in water, etc.; and the PVC backing adhesive has drawbacks such as low temperature embrittlement, containing DOP, hard to be decomposed naturally, and causing environmental issues while being burned, etc.

In view of the shortcomings of traditional knitwear type loop member described above, there exists a need for a loop member of a hook-and-loop fastener assembly that can provide a stronger engagement strength and a tighter fastening result with the hook member, and a method and an apparatus for making the same.

SUMMARY OF THE INVENTION

One object of the present invention is to provide a loop member of a hook-and-loop fastener assembly that can provide a stronger engagement strength and a tighter fastening result with the hook member so as to overcome the problems of existing loop member. Another object of the present invention is to provide a method and an apparatus to make such loop member speedily, massively and at a low cost.

One aspect of the present invention provides a method for making a loop member of a hook-and-loop fastener assembly, and this method comprises: continuously providing a plurality of yarns in a predetermined pattern; plastically deforming the yarns into a desired loop shape; continuously providing a web of substrate; and directly securing the yarns that are plastically deformed into a desired loop shape to the substrate by a fusing bonding process.

According to one embodiment of the present invention, the step of plastically deforming the yarns into a desired loop shape preferably comprises using a pair of loop forming rolls to deform the yarns plastically, wherein the loop forming rolls comprises a rotatable male roll having a peripheral surface and a rotatable female roll having a peripheral surface and disposed in rotatable contact with the peripheral surface of the male roll, and wherein a plurality of longitudinal protruding ribs are provided on peripheral surface of the male roll and a plurality of corresponding longitudinal grooves are provided in the peripheral surface of the female roll so as to receive the ribs of the male roll when the male roll and the female contacts. Preferably, the peripheral surface of the male roll is heated to a temperature that is able to allow the yarns to be plastically deformed.

Preferably, the step of providing a plurality of yarns comprises providing the yarns to a space between the male and female rolls to allow the yarns to be pressed into the grooves of the female roll by the ribs of the male roll while passing through the male and female rolls so as to plastically deform the yarns into a desired loop shape. Preferably, the step of securing the yarns to the substrate is performed by using a thermal welding device or an ultrasonic welding device. Preferably, the substrate comprises non-woven fabric.

Another aspect of the present invention provides an apparatus for making a loop member of a hook-and-loop fastener assembly, and this apparatus comprises: a loop forming device including a rotatable male roll having a peripheral surface and a rotatable female roll having a peripheral surface and disposed in rotatable contact with the peripheral surface of the male roll, and wherein a plurality of longitudinal protruding ribs are provided on peripheral surface of the male roll and a plurality of corresponding longitudinal grooves are provided in the peripheral surface of the female roll so as to receive the ribs of the male roll when the male roll and the female contacts; a yarn supplying device disposed at an upstream side of a rotation direction of one of the male roll and the female roll to provide a plurality of yarns in a predetermined pattern to a space between the male and female rolls to allow the yarns to be pressed into the grooves of the female roll by the ribs of the male roll while passing through the male and female rolls so as to plastically deform the yarns into a desired loop shape; a loop securing device disposed at a downstream side of the rotation direction of one of the female roll opposed to the peripheral surface of the female roll to form a gap therebetween, wherein the loop securing device is capable of providing an energy sufficient to fuse the yarns; and a substrate supplying device disposed to supply a web of substrate through the gap between the loop securing device and the peripheral surface of the female roll, wherein at least a portion of the yarns that are plastically deform into a desired loop shape on the peripheral surface of the female roll are fused to the substrate by the energy provided by the loop securing device, whereby the plastically deformed yarns are secured to the substrate and the loop member is thus formed.

Preferably, the peripheral surface of the male roll is heated to a temperature that is able to allow the yarns to be plastically deformed. Preferably, the step of securing the yarns to the substrate is performed by using a thermal welding device or an ultrasonic welding device.

According to another embodiment of the present invention, a method for making a loop member of a hook-and-loop fastener assembly is provided, and this method comprises: continuously providing a web of substrate to a working platform in a machine direction; providing a plurality of yarns over the substrate lying on the platform in a wave form, wherein each of the wave-form yarns has a plurality of wave peak portions and wave trough portions; and performing a fusing process to each of the wave-form yarns along a longitudinal axis of each yarns parallel to the machine direction to cause the wave peak portions and wave through portions of each of the yarns upstanding from the substrate while the yarns are secured to the substrate, whereby the loop member of a hook-and-loop fastener assembly is formed.

An apparatus for making a loop member of a hook-and-loop fastener assembly is also provided, and this apparatus comprises: a working platform; a substrate supplying device disposed to continuously providing a web of substrate to a working platform in a machine direction; a yarn supplying device disposed to provide a plurality of yarns over the substrate laid on the platform in a wave form, wherein each of the wave-form yarns has a plurality of wave peak portions and wave trough portions; a loop forming and securing device disposed opposed to the working platform to allow the substrate on which the yarns are laid to pass therethrough and including an energy generating unit and a plurality of working portions connected to the energy generating unit for fusing the yarns to the substrate by pressing and applying the energy to the yarns along a longitudinal axis parallel to the machine direction of each of the wave-form yarns while the substrate on which the yarns are laid passing between the loop forming device and the working platform so as to securing the yarns to the substrate as well as to cause the wave peak portions and wave trough portions of each of the yarns upstanding from the substrate as loops; and a transporting roller disposed to take the substrate on which the loops are formed out of the working platform.

According to still another embodiment of the present invention, a method for making a loop member of a hook-and-loop fastener assembly is provided, and this method comprises: providing a web of substrate in a machine direction, wherein the substrate has a front side, a rear side and a plurality of through holes formed from the front side to the rear side and arranged in an array having rows of through holes in the machine direction and columns of through holes in a direction perpendicular to the machine direction, and wherein each adjacent two through holes in the same rows are spaced an interval; continuously providing a plurality of yarns to the rear side of the substrate with the number of the yarns corresponding to the number of the rows of the through holes of the substrate and each yarn aligning with a respective row of through holes; causing portions of each yarn that laid over the through holes on the rear side of the substrate to penetrate the substrate through the through holes to a distance sufficient to form loops on the front side of the substrate; and securing the yarns to the substrate by melting and pressing the portions of the yarns resting on the intervals between adjacent through holes on the rear side of substrate to bond these portions to the substrate and to thereby securing the loops to the substrate.

Preferably, the step of causing the yarns to penetrate the substrate is performed by providing a suction force from the front side of the substrate. Preferably, the suction force is provided by a vacuum device having a plurality of recesses corresponding to the holes of the substrate. Preferably, the recesses may comprise a plurality of cavities corresponding to the holes of the substrate. Preferably, the recesses may comprise a plurality of grooves extending in the machine direction, each groove corresponding to a row of holes of the substrate. Preferably, the portions of the yarns rest on the intervals between adjacent holes on the rear side of substrate are melted by thermal energy or high frequency energy, and preferably the high frequency energy is an ultra sonic energy.

Also, an apparatus for making a loop member of a hook-and-loop fastener assembly is provided, and this apparatus comprises: a loop forming device having a plurality of loop forming recesses provided in a planer upper surface thereof and arranged in a number of rows along a machine direction, and a vacuum pump in fluid communication with the plurality of the recesses to intermittently generate a vacuum in these recesses; a substrate supply device disposed to provide a web of substrate onto the upper surface of the loop forming device, wherein the substrate has a front side facing the upper surface of the loop forming device, a rear side opposite to the front side, and a plurality of through holes formed therein from the front side to the rear side and arranged in rows corresponding to the rows of the recesses of the loop forming device and each adjacent two holes are spaced an interval; a yarn supply device disposed to provide a number of yarns to the rear side of the substrate in such a manner that the number of yarns corresponds to the number of rows of the holes of the substrate and each yarn aligns with a respective row of holes to allow portions of each yarn that laid over the holes may be sucked into the loop forming recesses through the holes to form loops on the front side of the substrate while a vacuum is generated in the recesses by the vacuum pump; and a loop securing device disposed to melt and press the portions of the yarns rest on the intervals between adjacent holes on the rear side of substrate to bond these portion to the substrate and to thereby securing the loops to the substrate.

Preferably, the loop forming recesses may be a plurality of cavities arranged in an array having rows of cavities in the machine direction and columns of cavities in a direction perpendicular to the machine direction, wherein the number of rows of cavities corresponds to the number of row of the recesses, and each two adjacent cavities in the same row are spaced the same interval as the of the holes. Alternatively, the loop forming recesses may be a number of loop forming grooves extending in the machine direction with the number of the grooves corresponding to the number of rows of the recesses. Preferably, the loop securing device may comprise an upper roller and a lower roller rotatably arranged to allow the substrate on which the loops are formed may pass therebetween, wherein the upper roller is heated to a temperature substantially the same as or above the melting temperature of the yarn or is configured to apply high frequency energy to melt the yarn, and preferably the high frequency energy may be ultra sonic energy.

According to yet another embodiment of the present invention, a method of for making a loop member of a hook-and-loop fastener assembly is provided, and this method comprises: continuously providing a web of substrate in a machine direction, the substrate having a front side and a rear side; knitting yarns to the substrate from the back side to the front side of the substrate to form loops on the front side of the substrate and stitches on the back side of the substrate; and securing the loops to the substrate by pressing and melting the stitches of yarns resting on the back side of the substrate to bond the yarns to the substrate.

Preferably, the step of knitting yarns to the substrate is performed by a plurality of knitting needles disposed over the rear side of the substrate and arranged in a predetermined pattern with yarns being provided thereto. Preferably, the step of securing the loops to the substrate is performed by a loop securing device configured to press and to apply thermal energy or high frequency energy, such as ultrasonic energy, to the stitches of yarns on the rear side of the substrate to melt the stitches of yarns.

Also, an apparatus for making a loop member of a hook-and-loop fastener assembly is provided, and this apparatus comprises: a substrate supply device configured to continuously supply a substrate in a machine direction, wherein the substrate has a front side and a rear side; a loop forming device configured to have the substrate passing therethrough and including a plurality of needles disposed at the rear side of the substrate with yarns being continuously provided thereto, wherein the needles are arranged in a predetermined pattern and reciprocating in a direction normal to a plane containing the substrate between a raised position on the rear side of the substrate and a knitting position below the front side of the substrate to form loops on the front side of the substrate and stitches on the rear side of the substrate; and a loop securing device configured to press and apply thermal energy or high frequency energy to the stitches of yarns on the rear side of the substrate to melt the stitches of yarns to bond the yarns to the substrate and to thereby securing the loops to the substrate.

Preferably, the loop securing device includes a welding block disposed on one side of the substrate and a counter roller rotatably disposed on the other side of the substrate, wherein the welding block reciprocates in a direction normal to the plane of the substrate between a working position at which the welding block contacts and presses the substrate and the stitches formed thereon against the counter roller and apply thermal energy or high frequency energy and a standby position at which the welding block is away from the counter roller. Preferably, the apparatus may further comprises a take-out device configured to advance the substrate on which the loops are formed in the machine direction.

Preferably, the substrate used in above embodiments may comprises a non-woven fabric, and the yarns used in above embodiments may be made of a material selected from a group consisting of a hot melt yarn, nylon, thermoplastic polyurethane (TPU).

Features and objects of the present invention other than the above will become more clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings, wherein.

DETAILED DESCRIPTION OF THE INVENTION

Referring now to embodiments illustrated in the drawings to describe an apparatus and a method for manufacturing a loop member of a hook-and-loop fastener assembly of the present invention, and a loop member manufactured thereby.

Figure 1:
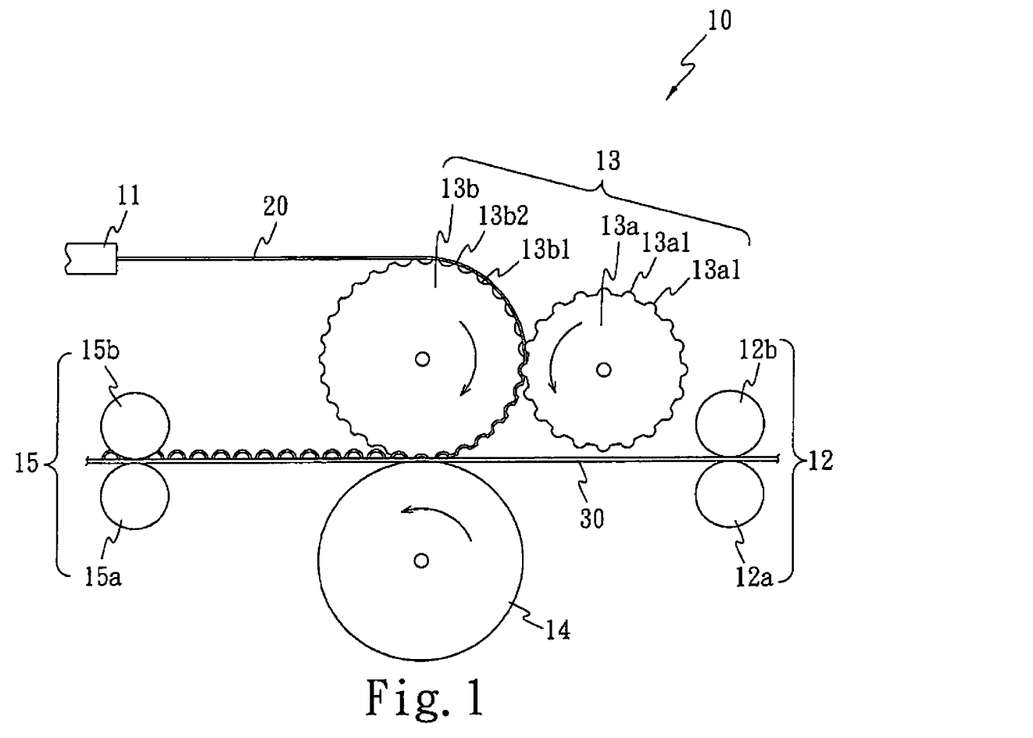
FIG. 1 is a schematic side elevation view of an apparatus for making a loop member of a hook-and-loop fastener assembly according to a first embodiment of the present invention.
Figure 2:
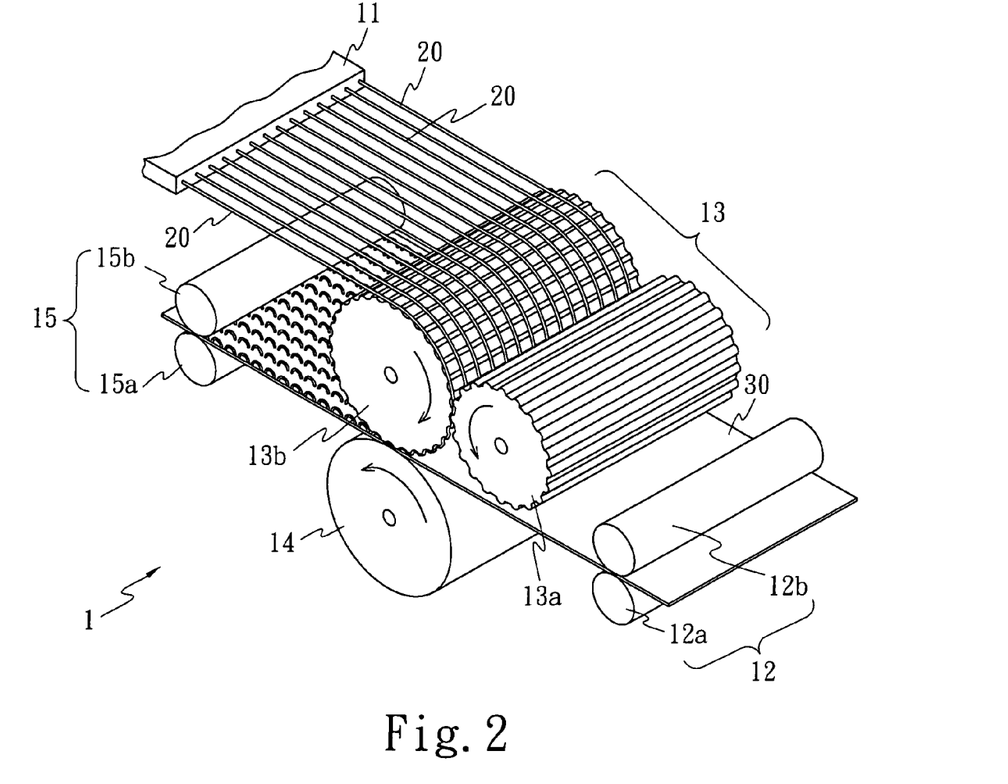
FIG. 2 is a schematic perspective view of the apparatus illustrated in FIG. 1.
Figure 3:
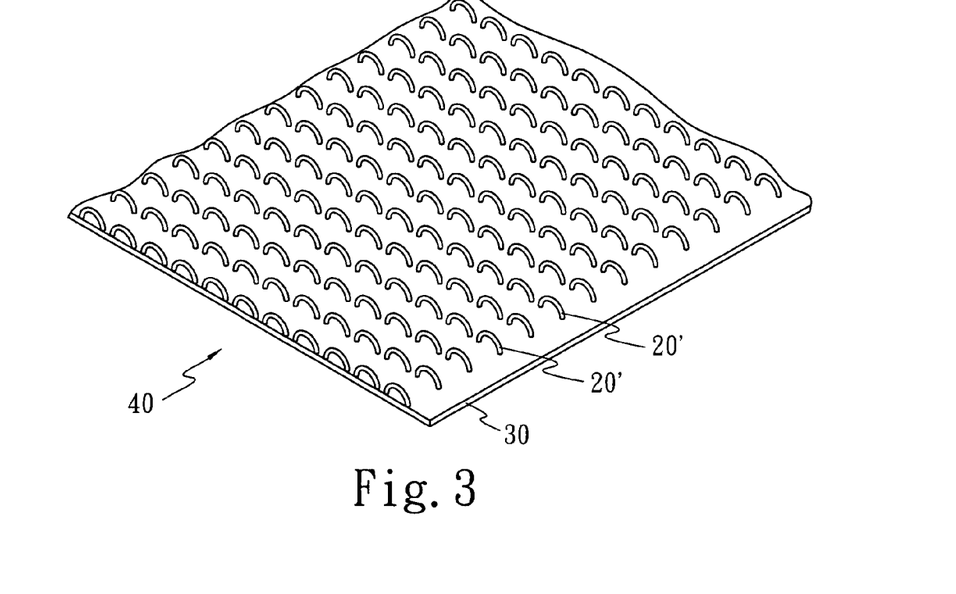
FIG. 3 is a schematic perspective view of a loop member manufactured according to the first embodiment of the present invention.

FIG. 1 is a is a schematic side elevation view of an apparatus for making a loop member of a hook-and-loop fastener assembly according to a first embodiment of the present invention; FIG. 2 is a schematic perspective view of the apparatus illustrated in FIG. 1; and FIG. 3 is a schematic perspective view of a loop member manufactured according to the first embodiment of the present invention.

A description of the apparatus for making a loop member of a hook-and-loop fastener assembly will be provided by referring to FIGS. 1 and 2. As illustrated in FIGS. 1 and 2, the apparatus 10 for making a loop member of a hook-and-loop fastener assembly mainly comprises a yarn supply device 11, a substrate supplying device 12, a loop forming device 13, a loop securing device 14 and a take-out device 15.

In the embodiment illustrated in FIGS. 1 and 2, the loop forming device 13 includes a rotatable male roll 13a and a rotatable female roll 13b. A plurality of circumferentially equally spaced longitudinal protruding ribs 13a1 are formed on a peripheral surface of the male roll 13a, and a plurality of circumferentially equally spaced longitudinal grooves 13b1 are correspondingly formed in a peripheral surface of the female roll 13b and a raised portion 13b2 is formed between adjacent two grooves 13b1. The male roll 13a and female roll 13b are disposed such that the peripheral surfaces thereof are in rotatable contact with each other so as to allow the ribs 13a1 of the male roll 13a to be received in the corresponding grooves 13b1 of the female rolls 13b, as illustrated in FIGS. 1 and 2. Additionally, the peripheral surface of the male roll 13a is heated to a temperature that is sufficient to soften the yarns and allow the yarns to be plastically deformed. The yarn supply device 11 is disposed at an upstream position of a rotation direction of the female roll 13b (i.e., the direction indicated by the arrow on the female roll 13b illustrated in FIGS. 1 and 2) to supply a plurality of yarns 20 to a space between the male roll 13a and the female roll 13b.

In this embodiment, the loop securing device 14 is a thermal welding roll 14 disposed at a downstream position of the rotation direction of the female roll 13*b* such that a small gap is formed between a peripheral surface thereof and the peripheral surface of the female roll 13*b*. Additionally, the peripheral surface of the thermal welding roll 14 is heated to a temperature above a melting temperature of the yarn. In this embodiment, the substrate supply device 12 includes a pair of substrate supply rollers 12*a*, 12*b* to supply a web of substrate 30 through the gap between the thermal welding roll 14 and the female roll 13*b*. Preferably, the substrate 30 is a non-woven fabric, and the yarns 20 may be made of a material that may be fused with the non-woven fabric, such as a hot melt yarn, nylon, thermoplastic polyurethane (TPU), and the like. In this embodiment, the take-out device 15 includes a pair of take-out rollers 15*a*, 15*b* which are disposed at a downstream side of the substrate supplying direction to take out the substrate on which a plurality of loops are formed out of the gap.

Next, a process of manufacturing a loop member of a hook-and-loop fastener assembly will be described with reference to FIGS. 1 and 2.

First, a plurality of yarns 20 are supplied in a predetermined pattern (such as, in a parallel pattern in this illustrated embodiment) to a space between the between the male roll 13*a* and the female roll 13*b*. Then, the yarns 20 are softened by the temperature of the peripheral surface of the female roll 13*b* and pressed into the grooves 13*b*1 of the female roll 13*b* by the ribs 13*a*1 of the male roll 13*b* while the male roll 13*a* and female roll 13*b* rotating with respect to each other. At the same time, the yarns are plastically deformed into a desired shape and attached to the peripheral surface of the female roll 13*b*.

Next, with the rotation of the female roll 13*b*, the yarns 20 that are plastically deformed into a desired shape and attached to the peripheral surface of the female roll 13*b* are passed along with the substrate 30 (i.e., the non-woven fabric) supplied by the substrate supply rollers 12*a* and 12*b* through the gap between the female roll 13*b* and the thermal welding roll 14. At this time, the portions of the yarns 20 that rest on the raised portions 13*b*2 of the female roll 13*b* are melted and thus fused to the substrate 30 because of the high temperature and the pressure applied by the peripheral surface of the thermal welding roll 14 so that the yarns 20 are secured to the substrate 30. Then, the portions of the yarns 20 that are plastically deformed in the grooves 13*b*1 of the female roll 13*b* are removed from the grooves 13*b*1 because the pulling force applied to the substrate 30 by the take-out rollers 15*a* and 15*b*, and a loop member 40 on which a plurality of loops 20' are formed is thus manufactured.

Figure 4:
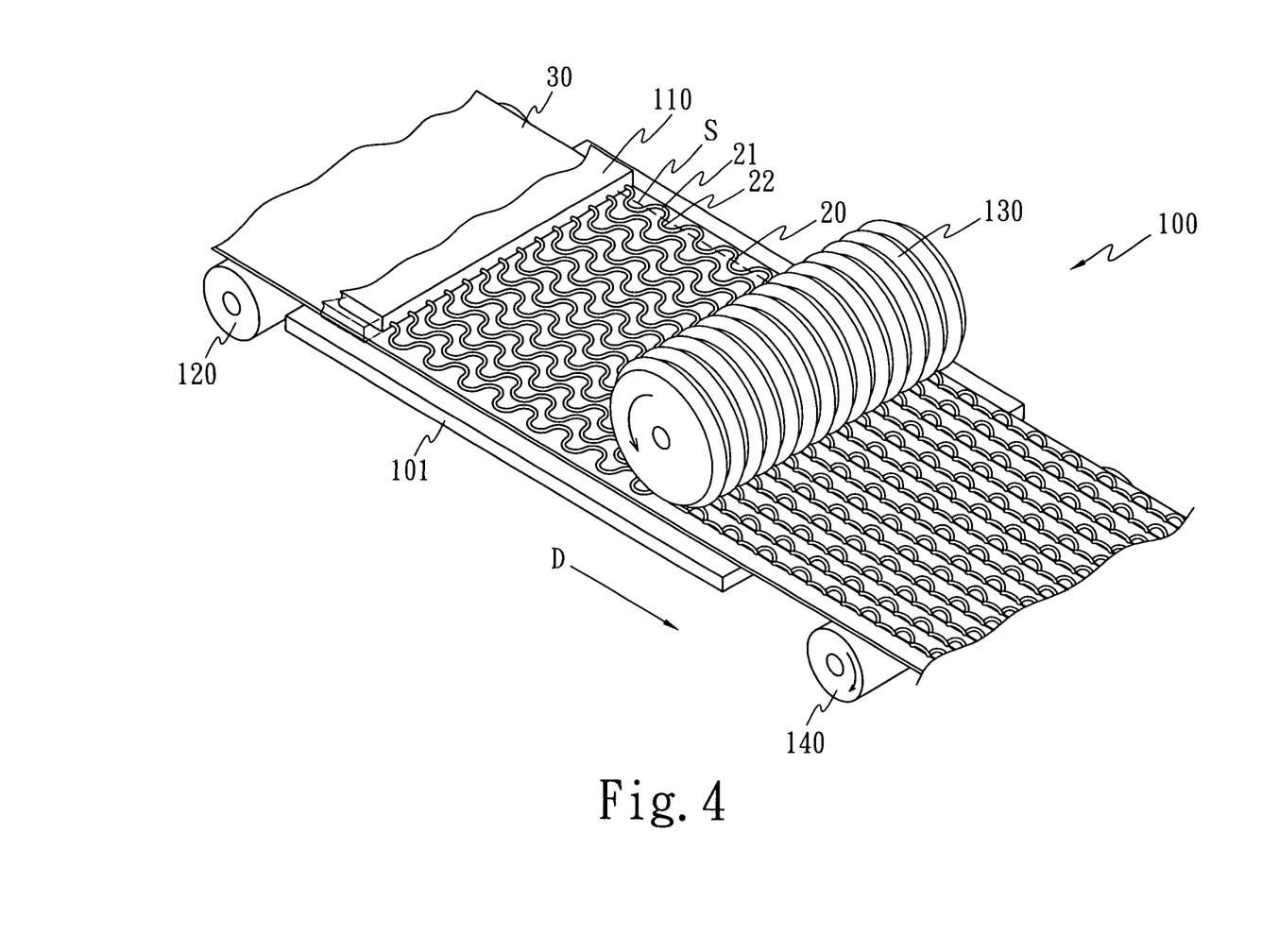
FIG. 4 is a schematic perspective view of an apparatus for making a loop member of a hook-and-loop fastener assembly according to a second embodiment of the present invention.
Figure 5:
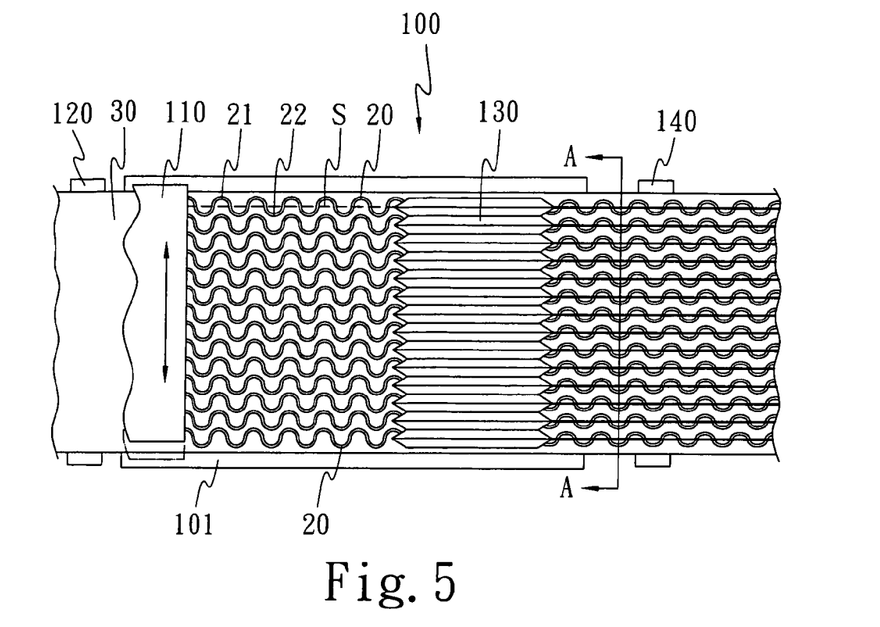
FIG. 5 is a schematic plan view of the apparatus illustrated in FIG. 4.
Figure 6:
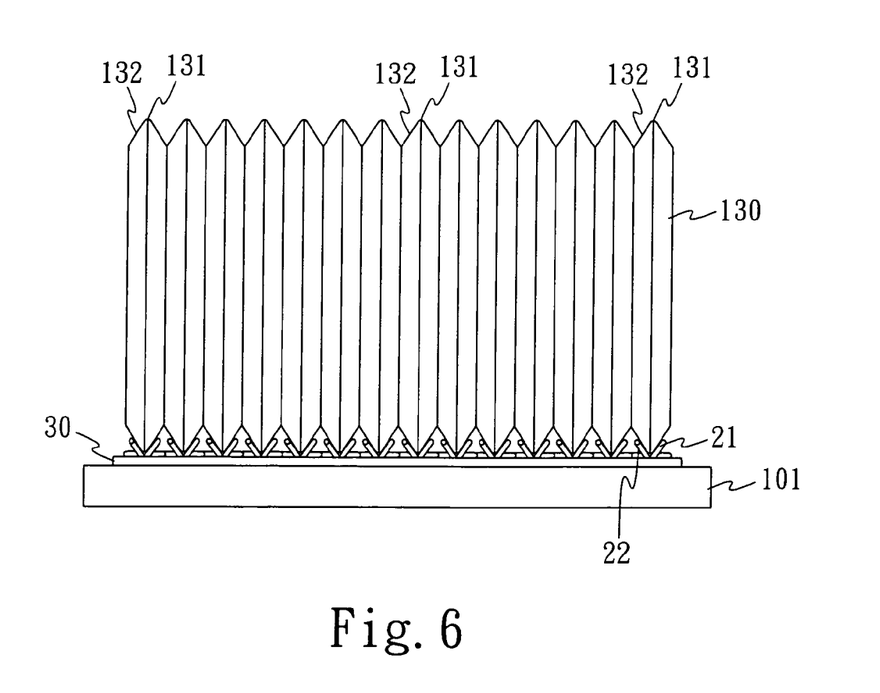
FIG. 6 is a schematic end view seen from an A-A end of FIG. 5.
Figure 7:
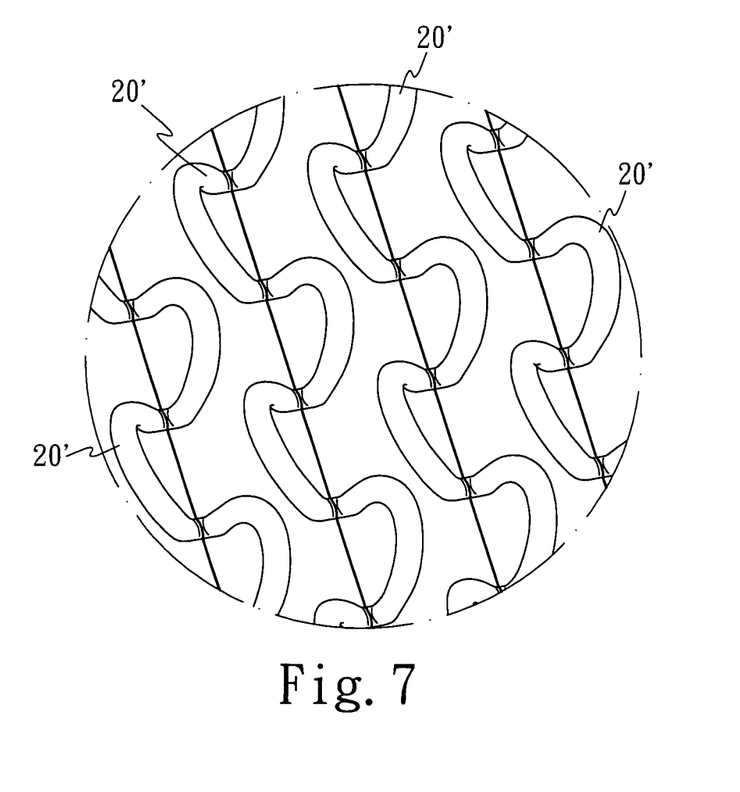
FIG. 7 is a partial enlarged view of a loop member manufactured according to the first embodiment of the present invention.

Next, an apparatus 100 for making a loop member of a hook-and-loop fastener assembly according to a second embodiment of the present invention will be described by referring to FIGS. 4-7, in which FIG. 4 is a schematic perspective view of the apparatus 100; FIG. 5 is a schematic plan view of the apparatus shown in FIG. 4; FIG. 6 is schematic end view seen from an A-A end of FIG. 5; and FIG. 7 is a partial enlarged view of a loop member manufactured according to the first embodiment of the present invention As shown in FIG. 4, the apparatus 100 mainly includes a working platform 101, a substrate supply device 120, a yarn supply device 110, a loop forming and securing device 130, and an export roller 140.

In this embodiment, the substrate supply device 120 is a substrate supply roller 120 disposed to supply a web of substrate 30 to the working platform 101. The yarn supply device 110 is configured to reciprocate in a plan substantially parallel to the substrate 30 so as to provide the yarns 20 in a wave form wherein each of the yarns 20 is in parallel with each other and each of the yarns 20 has a plurality of wave peak portions 21 and wave trough portions 22.

The loop forming and securing device 130 in this embodiment may be a rotatable cylinder disposed opposed to the working platform 101 with a peripheral surface thereof facing the working platform 101 and a gap is formed therebetween. A number of axially equally spaced ring-shaped teeth portions 131 are circumferentially formed on the peripheral surface of the loop forming and securing device 130 and a tapered recess portion 132 is formed between each two adjacent ring-shaped teeth portions 131. The loop forming and securing device 130 may further includes a energy generating unit (not shown), such as ultrasonic generator or heater, coupled to the ring-shaped teeth portions 131 to allow the ring-shaped teeth portions 131 to perform a thermal welding or an ultrasonic welding process. Preferably, the number of the ring-shaped teeth portions 131 corresponds to the number of yarns 20 and each of the ring-shaped teeth portions 131 aligns with a central axis $\underline{S}$ passing through each of the yarns 20 along a machine direction $\underline{D}$ (FIG. 4) in order to rotatably contact and press corresponding yarns 20 laid on the substrate 30 while the substrate 30 passing through the gap between the peripheral surface of the loop forming and securing device 130 and the working platform 101. The output roller 140 is disposed at a downstream side of the machine direction $\underline{D}$ to transport the processed substrate 30 out of the working platform 101.

Next, a process for making a loop member of a hook-and-loop fastener assembly according to a second embodiment of the present invention will be described.

First, substrate 30 is supplied to the working platform 101 by the substrate supply device 110. Preferably, the substrate 30 is a non-woven fabric. Then, a plurality of yarns 20 is supplied onto the substrate 30 laid on the platform 101 in a wave form. Preferably, the yarns 20 may be made of a material that may be fused with the non-woven fabric, such as a hot melt yarn, nylon, thermoplastic polyurethane (TPU), and the like. Then, the substrate 30 on which the yarns 20 are carried is passed through the gap between the peripheral surface of the loop forming and securing device 130 and the working platform 101. At this time, the ring-shaped teeth portions 131 of the loop forming and securing device 130 will rotatably contact and press corresponding yarns 20 along the central axis S of each yarn to apply the ultrasonic energy or heat energy to weld the yarns 20 to the substrate 30. Additionally, while the wave-form yarns 20 are welded to the substrate 30 by the ring-shaped teeth portions 131, the wave peak portions 21 and wave trough portions 22 of each yarn 20 will be caused to stand up from the substrate 30 along the slanted surfaces of the tapered recess portions 132, as shown in FIG. 6, to form the loops 20' as shown in FIG. 7. Then, the substrate 30 on which a plurality 20' are formed is transported out of the platform 101 by the export roller 140 as a loop member 40' of a hook-and-loop fastener assembly.

Figure 8:
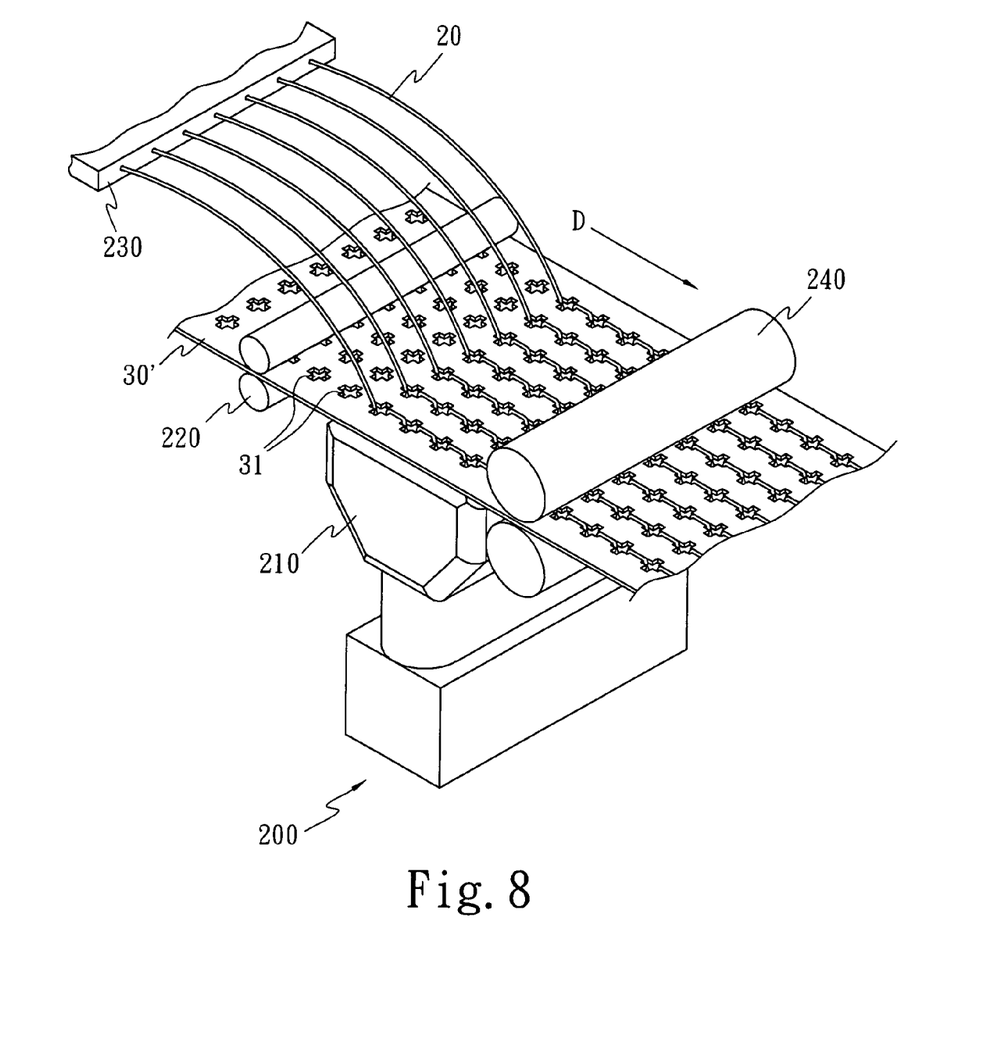
FIG. 8 is a schematic perspective view of an apparatus for making a loop member of a hook-and-loop fastener assembly according to a third embodiment of the present invention.
Figure 9:
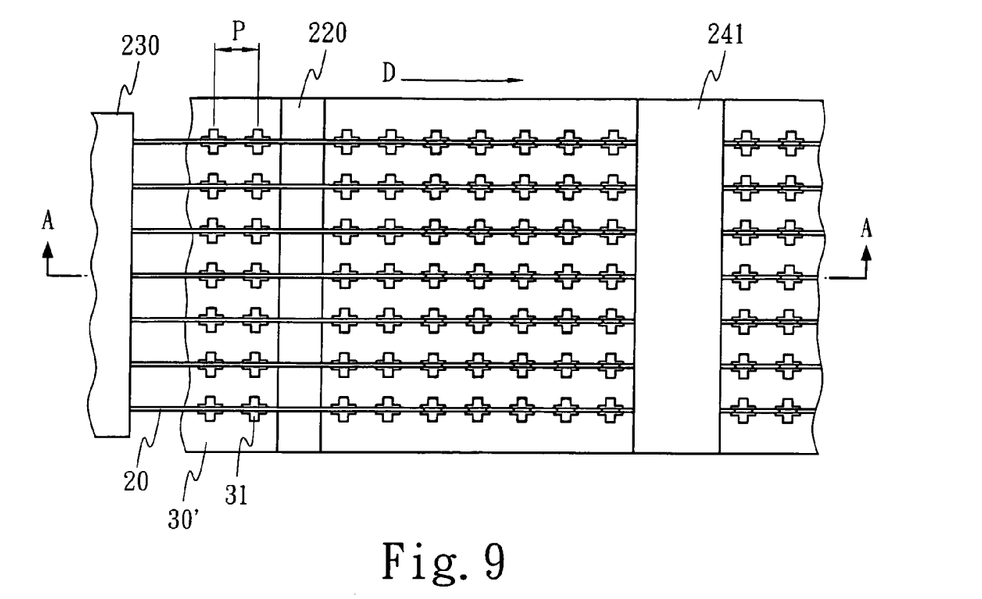
FIG. 9 is a schematic top plan view of the apparatus illustrated FIG. 8.

Next, an apparatus 200 for making a loop member of a hook-and-loop fastener assembly according to a third embodiment of the present invention will be described with reference to FIGS. 8-10, in which FIG. 8 is a schematic perspective view of the apparatus 200; FIG. 9 is a schematic view of the apparatus illustrated in FIG. 8; and FIG. 10 is a schematic cross-sectional view taken along a line A-A' of FIG. 9.

Figure 10:
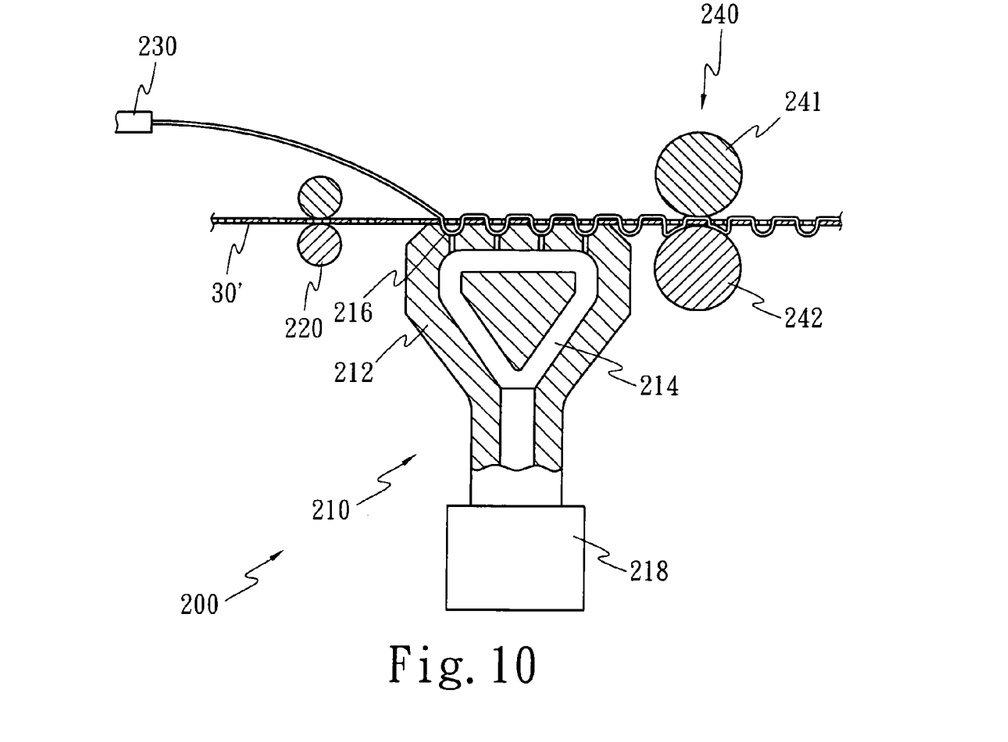
FIG. 10 is a schematic cross-sectional view taken along a line A-A' of FIG. 9.

As shown in FIGS. 8-10, the apparatus 200 mainly includes a loop forming device 210, a substrate supply device 220, a yarn supply device 230, and a loop securing device 240.

In this embodiment, the loop forming device 210 may be a vacuum sucking device which includes a head 212 having a planer upper surface and a number of air passageways 214 formed therein, a plurality of loop forming recesses 216 provided in the planer upper surface, arranged in rows in a machine direction D and in fluid communication with the air passageways 214, and a vacuum pump 218 connected to the head 212 and in fluid communication with the air passageways 214, as schematically illustrated in FIG. 9. Preferably, the plurality of recesses 216 may be a plurality of cavities 216 that are arranged in an array having rows of cavities in the machine direction D and columns of cavities in a direction perpendicular to the machine direction D and every adjacent two cavities in the same row are spaced an interval p, and the number of the rows of cavities corresponds to the number of rows of the recesses. Alternatively, the plurality of recesses 216 may be a number of loop forming grooves extending in the machine direction D (not shown in the Figs.) with the number of the grooves corresponding to the number of rows of the recesses.

The substrate supply device 220 may be a substrate supply roller disposed at an upstream side of the loop forming device 210 in the machine direction D to supply a web of substrate 30' to the planer upper surface of the loop forming device 210. The substrate 30' has a front side, a rear side opposite to the front side, and a plurality of through holes 31 formed from the front side to the rear side and arranged in a manner that corresponds to the manner that the plurality of the recesses 216 of the loop forming device 210 are arranged. For instance, in either case of the arrangement manners of the recesses 216 mentioned above, the plurality of through holes 31 may be arranged in an array having rows of holes in the machine direction D and columns of holes in the direction perpendicular to the machine direction D, and the number of rows corresponds to the number of rows of the loop forming cavities or the number of loop forming grooves extending in the machine direction D, and every adjacent two holes 31 in the same row are spaced the interval p. Preferably, the substrate 30' may be a non-woven fabric.

The yarn supply device 230 is also disposed at an upstream side of the loop forming device 210 in the machine direction D to supply a number of yarns 20 to the substrate 30' that is provided on the upper surface of the loop forming device 210 in a manner that the number of yarns 20 corresponds to the number of rows of the holes 31 and each yarn 20 aligns with a respective row of holes 31. Preferably, the yarns 20 may be made of a material that may be fused with the non-woven fabric, such as a hot melt yarn, nylon, thermoplastic polyurethane (TPU), and the like. The loop securing device 240 is disposed at a downstream side of the loop forming device 210 in the machine direction D and may includes an upper roll 241 and a lower roll 242 rotatably arranged such that the substrate 30' on which the yarns 20 are laid may pass therebetween. The upper roll 241 may be heated to a temperature above the melting temperature of the yarn 20. Alternatively, upper roll 241 may be adapted to generate high frequency energy, e.g., ultrasonic energy, to melt the yarns 20. The upper roll 241 and lower roll 242 may also function as a take-out device to advance the substrate 30' in the machine direction D.

In operation, the substrate supply device 220 first supply the substrate 30' to the loop forming device 210 with its front side facing the upper surface of the loop forming device 210 and each hole 31 in each row of holes aligning with a cavity 216 in a respective row of cavities. Then, the yarn supply device 230 supply a number of yarns 20 onto the rear side of the substrate 30' with each yarn 20 align with a respective row of holes. Next, the loop forming device 210 generates a vacuum state in each of the cavities 216 to suck the yarn portions laid above the holes 31 into the cavities 216 to form the loops on the front side of the substrate 30'. Then, the substrate 30' on which the loops are formed are advanced to pass between the upper roll 241 and lower roll 242 at which the yarn portions laid on the rear side of the substrate 30' are pressed and melted by the upper roll 241 to bond to the substrate 30' and thus to secure the yarns 20 to the substrate 30' to form the loop member of a hook-and-loop fastener assembly.

Figure 11:
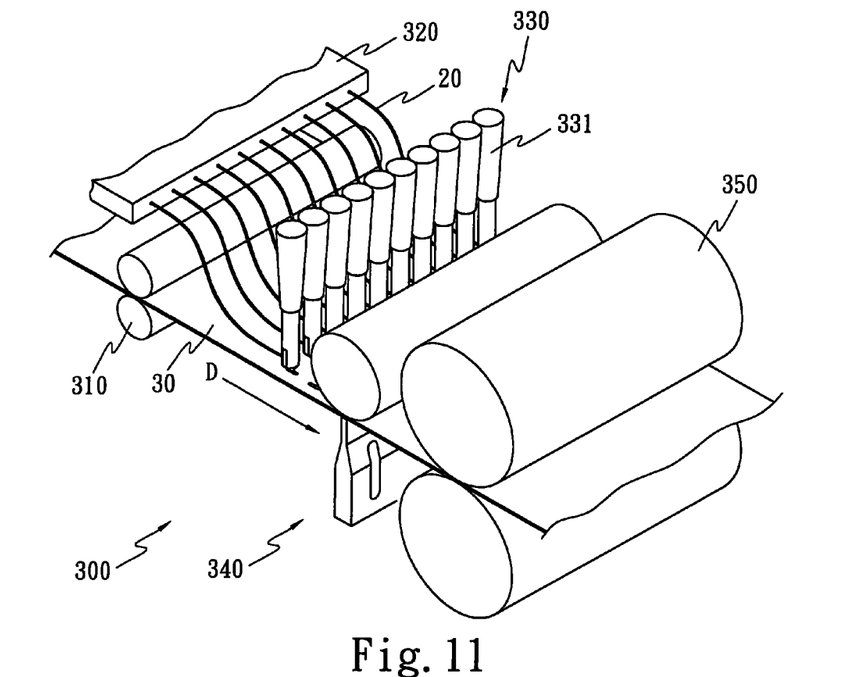
FIG. 11 is a schematic perspective view of an apparatus for making a loop member of a hook-and-loop fastener assembly according to a fourth embodiment of the present invention.
Figure 12:
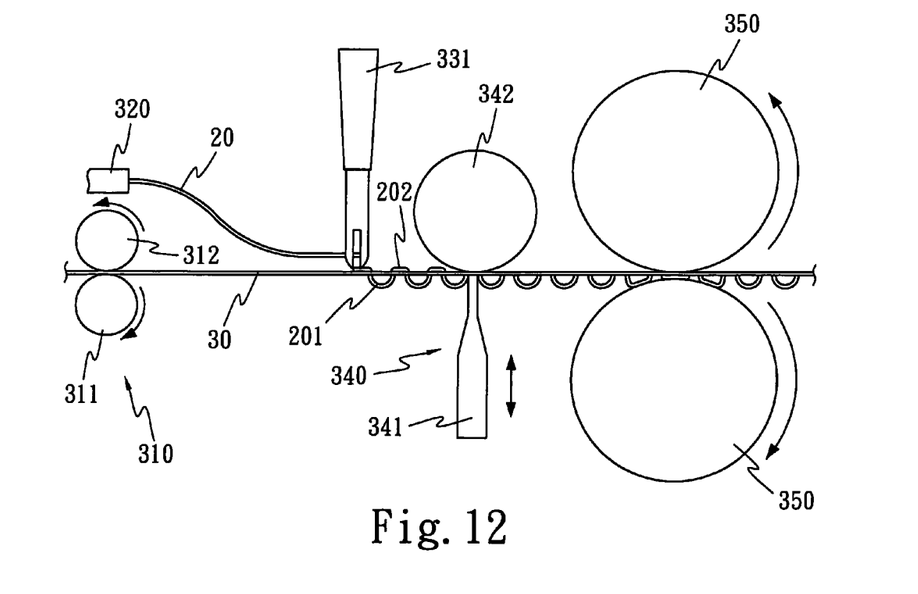
FIG. 12 is a schematic side view of the apparatus shown in FIG. 10.

Next, an apparatus 300 for making a loop member of a hook-and-loop fastener assembly according to a fourth embodiment of the present invention will be described with reference to FIGS. 11 and 12, in which FIG. 11 is a schematic perspective view of the apparatus 300 for making a loop member of a hook-and-loop fastener assembly according to a fourth embodiment of the present invention; and FIG. 12 is a schematic side view of the apparatus 300 shown in FIG. 11.

As shown in FIGS. 11 and 12, the apparatus 300 mainly includes a substrate supply device 310, a yarn supply device 320, a loop forming device 330, a loop securing device 340, and a pair of take-out rollers 350.

The substrate supply device 310 includes a pair of substrate supply rollers 311, 312 arranged to continuously supply a web of substrate 30 in a machine direction D. The substrate 30 has a front side and a rear side and is supplied with the front side facing downward and the rear side facing upward. Preferably, the substrate 30 is a non-woven fabric. The loop forming device 330 includes a plurality of knitting needles 331 arranged in a row in a direction perpendicular to the machine direction D with each needle 331 being provided with a yarn 20 at a tip portion thereof by a yarn supplying device 320. Preferably, the yarns 20 may be made of a material that may be fused with the non-woven fabric, such as a hot melt yarn, nylon, thermoplastic polyurethane (TPU), and the like. The needles 331 reciprocate in a direction normal to a plane containing the substrate 30 between a raised position above the plane of the substrate 30 and a knitting position below the plane of the substrate 30 so as to form loops 201 on the front side of the substrate 30 and stitches 202 on the rear side of the substrate 30. Other arrangements of the needles 331 are also possible. For instance, the needles 331 may be arranged in at least two rows with the needles 331 in one row offset from the needles 331 in adjacent rows.

The loop securing device 340 is disposed at a downstream side of the loop forming device 330 in the machine direction D and includes a welding block 341 disposed below the plane of the substrate 30 and a counter roller 342 rotatably disposed above the plane of the substrate 30 opposite to the welding block 341. The welding block 341 may reciprocate in a direction normal to the plane of the substrate 30 between a working position at which the welding block 341 contacts and presses the substrate 30 against the counter roller 342 and a standby position at which the welding block 341 is away from the counter roller 342. The welding block 341 may connect to a high frequency generator (not shown), such as an ultrasonic generator, so as to apply a high frequency energy at a portion that contacts the counter roller 342. Alternatively, the welding block 341 may connect to a heater (not shown) so as to heat the portion that contacts the counter roller 342 to a temperature substantially the same as or above the melting temperature of the yarns 20. The take-out rollers 350 are rotatably disposed at a downstream side from the loop securing device 340 in the machine direction D and arranged to advance the substrate 30 in the machine direction D in a controllable manner.

In operation, while the substrate supply device 310 continuously supplying the substrate 30 through the loop forming device 330 under the needles 331, the needles 331 reciprocate in a direction normal to the plane of the substrate 30 from the raised position to the knitting position to penetrate the substrate 30 from the rear side to the front side of the substrate 30 to form loops 201 on the front side of the substrate 30 and stitches 202 on the rear side of the substrate 30. Then, the substrate 30 on which the loops 201 and stitches 202 are formed is advanced to pass between the welding block 341 and the counter roller 342 of the loop securing device 340. As the substrate 30 passing through the loop forming device 340, the welding block 341 is controlled to move from the standby position to the working position when the stitches 202 come between it and the counter roller 342 so as to press the substrate 30 as well as the stitches 202 against the counter roller 342 and to melt the stitches 202 and bond them to the substrate 30, and to thereby securing the loops 201 to the substrate 30. The density of the loops may be modified by adjusting the rate of the reciprocal movement of the needles 331 and/or the advancing rate of the substrate 30 with an adjustment of the rate of the reciprocal movement of the welding block 341.

In place of forming a loop member of a hook-and-loop fastener assembly by knitting the warps and wefts to form loops as utilized by traditional processes for making a knitwear type loop member, present invention makes a loop member of a hook-and-loop fastener assembly by bonding loop shape yarns directly to the substrate with thermal energy or high frequency energy. Therefore, while comparing to the traditional techniques, the present invention is able to produce a loop member of a hook-and-loop fastener assembly having a stronger engagement strength and a tighter fastening result with the hook member in a more speedy, massive way and at a lower cost.

The present invention utilizes a technical idea that is completely different from that of traditional techniques for forming a loop member of a hook-and-loop fastener assembly to not only overcome shortcomings of traditional techniques but also achieve functions/effects superior to existing knitwear type loop member. Therefore, the present invention is clearly an invention with great industrial applicability.

Although the present invention has been described above according to preferred embodiments of a loop member of a hook-and-loop fastener assembly, the apparatus and method illustrated in the accompanying drawings, this does not mean that the scope of the present invention is limited to specific configurations of the a loop member of a hook-and-loop fastener assembly and apparatus, and the steps or sequences of the method described above. In fact, there exist various modifications and variations under the principle and spirit disclosed above. For instance, the thermal welding roll 14 of the first embodiment may be replaced with an ultrasonic welding roll. Additionally, the yarns may be provided in patterns other than the parallel pattern as illustrated in the first embodiment; and the yarns may be deformed with ribs and grooves having shapes different from that is illustrated in the first embodiment.

It will be apparent to people skilled in this art that many modifications can be made to the disclosed structures without departing from the true scope of the invention defined by the appended claims. Therefore, it is the intent of the appended claims to cover all such variations and modifications as come within the sprit and scope of this invention.

What is claimed is:

1. A method for making a loop member of a hook-and-loop fastener assembly, comprising the steps of:
   continuously providing a web of substrate to a working platform in a machine direction;
   providing a plurality of yarns over the substrate lying on the platform in a wave form, wherein each of the waveform yarns has a plurality of wave peak portions and wave trough portions defined on opposing sides of a waveform centerline; and
   performing a fusing process to each of the wave-form yarns along a longitudinal axis of each of the yarns parallel to the machine direction wherein each of the yarns is fused to the substrate at intervals along the waveform centerline between wave peak and wave trough portions to cause the wave peak portions and wave trough portions of each of the yarns to be formed as upstanding free loops of the yarns, wherein each of the upstanding free loops defines a space between the yarn and the substrate, while the yarns are secured to the substrate along the waveform centerline, wherein the upstanding free loops are adapted to receive and retain hooks of a hook-and-loop fastener assembly;
   wherein the fusing process comprises melting spaced apart portions of the yarns to weld the portions of the yarns to a surface of the substrate and is carried out by a rotatable cylinder having a number of teeth portions circumferentially formed on a peripheral surface thereof configured to cause the wave peak portions and wave trough portions of the yarns to stand UP from the substrate along surfaces of the teeth portions.

2. A method for making a loop member of a hook-and-loop fastener assembly according to claim 1, wherein the fusing process is carried out by applying an high frequency energy or a thermal energy.

3. A method for making a loop member of a hook-and-loop fastener assembly according to claim 1, wherein the substrate comprises a non-woven fabric, and wherein the yarns are made of a material selected from a group consisting of a hot melt yarn, nylon, thermoplastic polyurethane (TPU).

4. A method of making a loop member of a hook-and-loop fastener assembly according to claim 1, wherein the fusing process is carried out by a rotatable cylinder having a number of axially equally spaced ring-shaped tapered teeth portions circumferentially formed on a peripheral surface thereof configured to cause the wave peak portions and wave trough portions of each of the yarns to stand up from the substrate along slanted surfaces of the tapered teeth portions.

* * * * *